(12) United States Patent
Krause

(10) Patent No.: US 7,164,760 B2
(45) Date of Patent: Jan. 16, 2007

(54) AUDIBLE CALLER IDENTIFICATION WITH NAMETAG STORAGE

(75) Inventor: Kevin R. Krause, Plymouth, MI (US)

(73) Assignee: General Motors Corporation, Detroit, MI (US)

( * ) Notice: Subject to any disclaimer, the term of this patent is extended or adjusted under 35 U.S.C. 154(b) by 677 days.

(21) Appl. No.: 10/661,987

(22) Filed: Sep. 12, 2003

(65) Prior Publication Data

US 2005/0058266 A1    Mar. 17, 2005

(51) Int. Cl.
H04M 1/56 (2006.01)
H04M 15/06 (2006.01)

(52) U.S. Cl. .............. 379/142.06; 379/80; 379/88.01; 379/88.16; 379/88.18; 455/415; 455/425; 455/567

(58) Field of Classification Search .............. 379/67.1, 379/88.01, 68, 88.04, 71, 88.12, 76, 88.16, 379/88.18–19, 88.21, 88.23, 88.27, 80–82, 379/142.01, 142.06, 142.17; 455/415, 425, 455/550–551, 556–557, 567
See application file for complete search history.

(56) References Cited

U.S. PATENT DOCUMENTS

| 5,265,145 A | * | 11/1993 | Lim .......................... 379/88.2 |
| 5,498,841 A | * | 3/1996 | Allen .......................... 181/137 |
| 5,511,111 A | * | 4/1996 | Serbetcioglu et al. ..... 379/88.01 |
| 5,533,102 A | * | 7/1996 | Robinson et al. ........ 379/88.25 |
| 5,999,611 A | * | 12/1999 | Tatchell et al. ........ 379/211.02 |
| 6,178,232 B1 | * | 1/2001 | Latter et al. ............. 379/88.21 |
| 6,459,780 B1 | * | 10/2002 | Wurster et al. ........ 379/142.02 |
| 6,804,330 B1 | * | 10/2004 | Jones et al. .............. 379/88.01 |
| 6,882,838 B1 | * | 4/2005 | Lee et al. .................... 455/417 |
| 2005/0117733 A1 | * | 6/2005 | Widger et al. ......... 379/221.05 |

* cited by examiner

Primary Examiner—Binh K. Tieu
(74) Attorney, Agent, or Firm—Anthony Luke Simon

(57) ABSTRACT

The present invention provides a system and method for audible caller identification with nametag storage. A call signal is received, the call signal including an automatic number identification. A determination is made whether the automatic number identification matches a nametag-identified number on a nametag list stored in a telematics unit. An audible user action identification message is sent based on the determination. Monitoring for a user voice response to the audible user action identification message is performed. A determination is made whether to connect the call signal based on a received user voice response. The call signal is sent to a voice mail system or sent to a phone based on the received user voice response. An audible nametag storage message is sent. A computer usable medium with suitable computer program code is employed for audible caller identification with nametag storage.

15 Claims, 3 Drawing Sheets

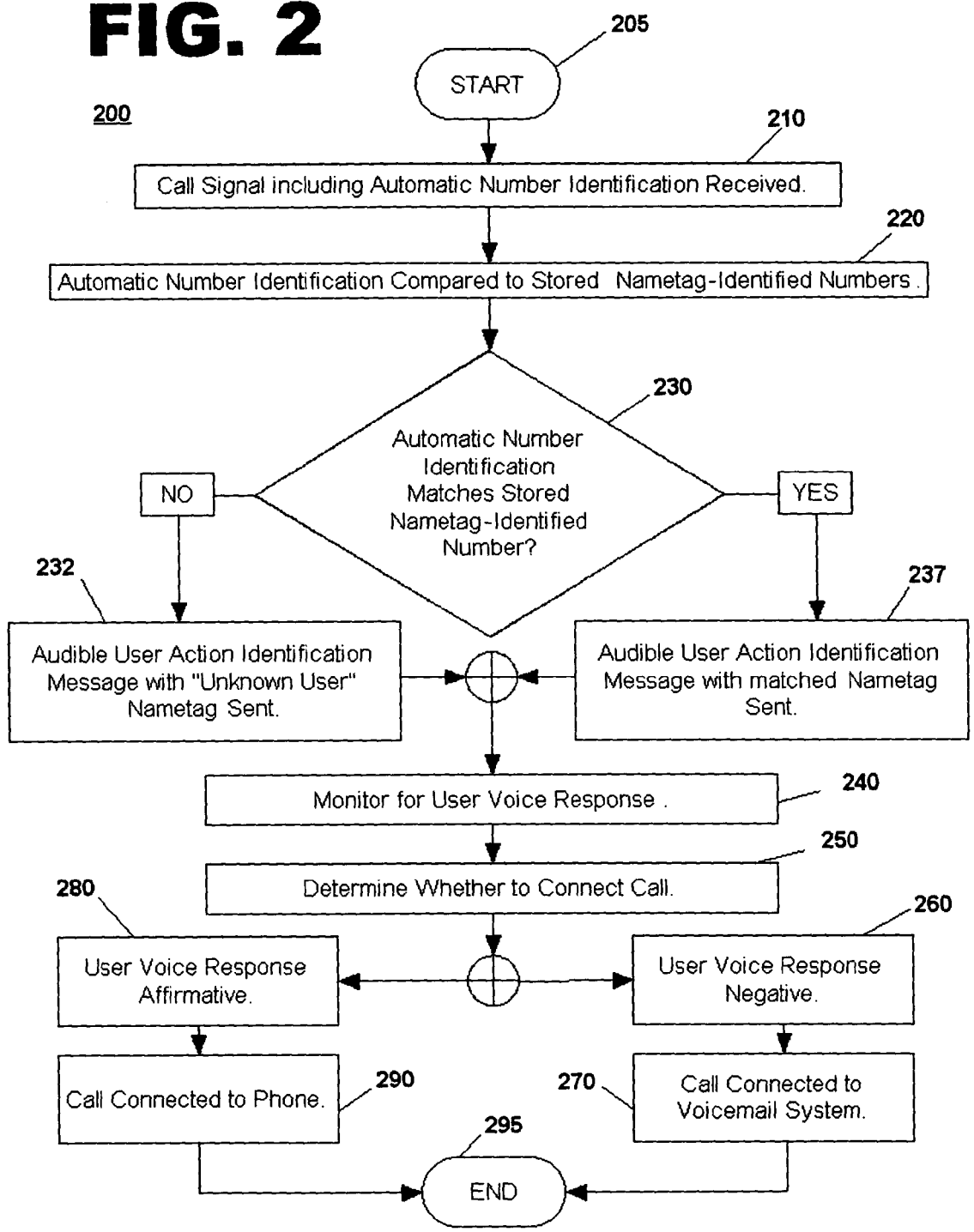

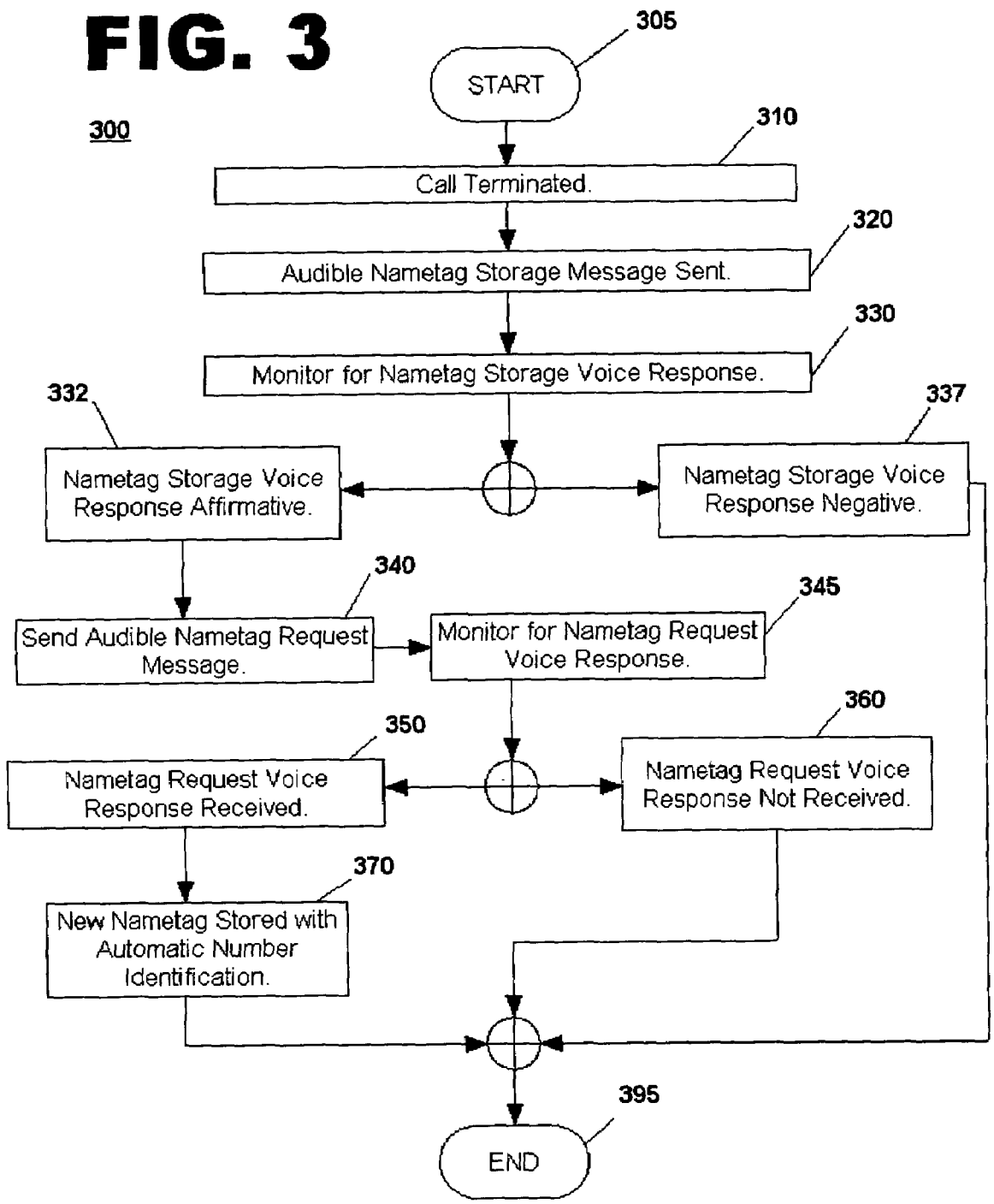

AUDIBLE CALLER IDENTIFICATION WITH NAMETAG STORAGE

FIELD OF THE INVENTION

This invention relates generally to caller identification. In particular the invention relates to a system and method for audible caller identification with nametag storage.

BACKGROUND OF THE INVENTION

One of the fastest growing areas of communications technology is related to automobile network solutions. The demand and potential for wireless vehicle communication, networking and diagnostic services have recently increased. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location, assist in tracking vehicle after a theft of the vehicle and provide other vehicle-related services. Drivers can call telematics call centers and receive navigational, concierge, emergency, and location services, as well as other specialized help such as locating the geographical position of a stolen vehicle and honking the horn of a vehicle when the owner cannot locate it in a large parking garage.

Caller identification, or caller ID, technology has made possible informing a person of the identity of a caller before the call is answered. Caller ID systems present caller information on a display screen in text format or through a speaker in audible format. The person receiving the call then has the choice of allowing the call to go to a voicemail system or of answering the call by lifting a phone's handset or pressing a button on the phone to answer the call. Current caller ID systems are limited to informing the user of the caller's phone number and in some cases the caller's name as supplied by the phone service provider. All caller ID systems require some form of physical interaction with the phone when a person wishes to answer an incoming call.

It is desirable therefore, to provide a system and method for audible caller identification with nametag storage, that overcomes the challenges and obstacles described above.

SUMMARY OF THE INVENTION

The current invention provides a method for audible caller identification with nametag storage. A call signal, including an automatic number identification is received. It is determined whether the automatic number identification matches a nametag-identified number on a nametag list stored in a telematics unit. An audible user action identification message is sent based on the determination. The method monitors for a user voice response to the audible user action identification message and then determines whether to connect the call based on a received user voice response. The call signal is sent to a voice mail system or sent to a phone based on the received user voice response. An audible nametag storage message is sent and the method monitors for a nametag storage voice response to the audible nametag storage message then determines whether to store a new nametag-identified number to the nametag list based on a received nametag storage voice response.

Another aspect of the current invention provides a computer usable medium including computer program code for audible caller identification with nametag storage. The computer program code receives a call signal, including an automatic number identification. The computer program code determines whether the automatic number identification matches a nametag-identified number on a nametag list stored in a telematics unit. Computer program code sends an audible user action identification message based on the determination. The computer program code monitors for a user voice response to the audible user action identification message and then determines whether to connect the call based on a received user voice response. Computer program code sends the call signal to a voicemail system or sends the call signal to a phone based on the received user voice response. Computer program code sends an audible nametag storage message and monitors for a nametag storage voice response to the audible nametag storage message and then determines whether to store a new nametag-identified number to the nametag list based on a received nametag storage voice response.

Another aspect of the current invention provides a system for audible caller identification with nametag storage. The system receives a call signal, the call signal including an automatic number identification and determines whether the automatic number identification matches a nametag-identified number on a nametag list stored in a telematics unit. The system then sends an audible user action identification message based on the determination and monitors for a user voice response to the audible user action identification message. The system then determines whether to connect the call signal based on a received user voice response. The system sends the call signal to a voicemail system or sends the call signal to a phone based on the received user voice response. The system sends an audible nametag storage message and monitors for a nametag storage voice response to the audible nametag storage message. The system then determines whether to store a new nametag-identified number to the nametag list based on a received nametag storage voice response.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of a method for audible caller identification in accordance with one embodiment of the current invention; and FIG. 3 is a flow diagram of a method for nametag storage in accordance with one embodiment of the current invention.

DETAILED DESCRIPTION OF THE PRESENTLY PREFERRED EMBODIMENTS

Figure 1:
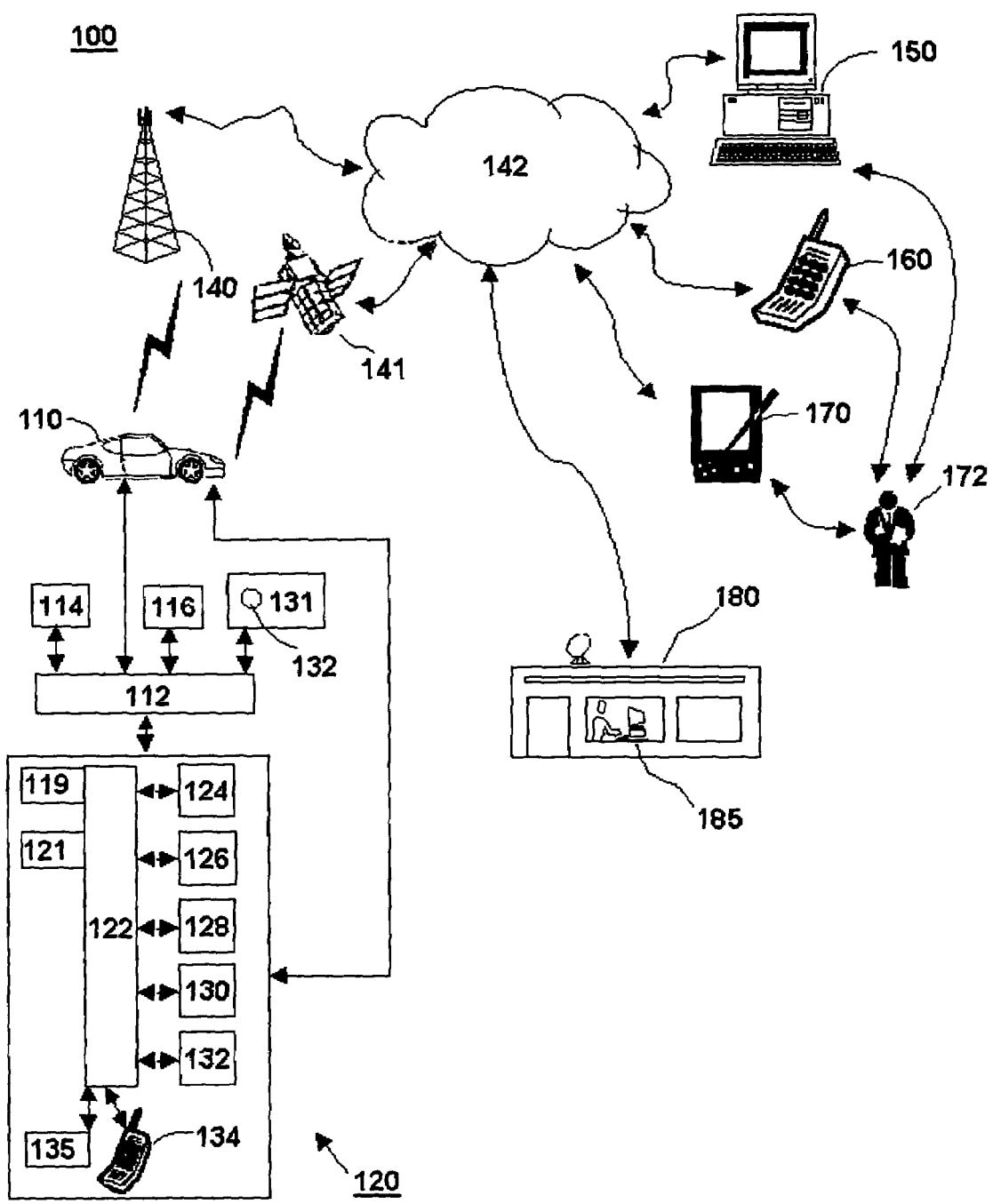
FIG. 1 is a schematic diagram of a system for audible caller identification with nametag storage in accordance with one embodiment of the current invention.

FIG. 1 is a schematic diagram of a system for audible caller identification with nametag storage in accordance with one embodiment of the current invention at 100. Audible caller identification with nametag storage system 100 includes a mobile vehicle 110, a telematics unit 120, one or more wireless carrier systems 140 or satellite carrier systems 141, one or more communication networks 142, and one or more call centers 180. Mobile vehicle 110 is a vehicle such as a car or truck equipped with suitable hardware and software for transmitting and receiving voice and data communications.

In one embodiment of the invention, telematics unit 120 includes a digital signal processor (DSP) 122 connected to a wireless modem 124, a global positioning system (GPS) receiver or GPS unit 126, an in-vehicle memory 128, a microphone 130, one or more speakers 132, an embedded or in-vehicle phone 134 or email access appliance 135. DSP 122 is also referred to as a microcontroller, controller, host processor, or vehicle communications processor. GPS unit 126 provides longitude and latitude coordinates of the vehicle, as well as a time stamp and a date stamp. In-vehicle phone 134 is an analog, digital, dual-mode, dual-band, multi-mode or multi-band cellular phone.

Telematics unit 120 can store nametag-identified numbers, vehicle data upload (VDU) records, and other data files in in-vehicle memory 128. Telematics unit 120 can set or reset calling-state indicators and can enable or disable various cellular-phone, telematics-unit functions and vehicle components when directed by microcode running on DSP 122. Telematics unit 120 can send and receive over-the-air messages using, for example, a pseudo-standard air-interface function or other proprietary and non-proprietary communication links.

DSP 122 executes various computer programs and computer program code that control programming and operational modes of electronic and mechanical systems within telematics unit 120. DSP 122 controls communications between telematics unit 120, wireless carrier system 140 or satellite carrier system 141 and call center 180. A voice-recognition engine 119, which can translate human voice input through microphone 130 to digital signals, is installed in telematics unit 120. For example, programming of in-vehicle phone 134 is controlled with verbal commands that are translated by voice-recognition software executed by DSP 122. Alternatively, pushing buttons on an interface of telematics unit 120 or in-vehicle phone 134 is used to change a phone number or activate other functions. The interface to telematics unit 120 includes one or more buttons on the telematics unit, radio console, or associated keyboard or keypad. In another embodiment, the interface to telematics unit 120 includes other forms of preference and data entry including touch-screens, wired or wireless keypad remotes, or other wirelessly connected devices such as Bluetooth-enabled devices or 802.11-enabled devices.

DSP 122 controls, generates and accepts digital signals transmitted between telematics unit 120 and a vehicle communication bus 112 that is connected to various vehicle components 114, sensors 116, and audio system 131 in mobile vehicle 110. DSP 122 can activate various programming and operation modes, as well as provide for data transfers. In one embodiment of the invention, signals from DSP 122 are translated into voice messages and sent out through speaker 132. Generated voice messages comprise user action identification messages, nametag storage messages and nametag request messages.

Mobile vehicle 110 via telematics unit 120 sends and receives radio transmissions from wireless carrier system 140, or satellite carrier system 141. Wireless carrier system 140, or satellite carrier system 141 is any suitable system for transmitting a signal from mobile vehicle 110 to communication network 142.

Communication network 142 includes services from mobile telephone switching offices, wireless networks, public-switched telephone networks, and Internet protocol (IP) networks. Communication network 142 comprises a wired network, an optical network, a fiber network, another wireless network, or any combination thereof. Communication network 142 connects to mobile vehicle 110 via wireless carrier system 140, or satellite carrier system 141. Communication network 142 connects wireless carrier system 140 or satellite carrier system 141 to user computer 150, wireless or wired phone 160, handheld device 170, such as a personal digital assistant, and call center 180. Communication network 142 uses any appropriate wireless technology, including CDMA, TDMA, FDMA, and GSM or satellite carrier system.

Communication network 142 can send and receive short messages according to established protocols such as IS-637 standards for short message service (SMS), IS-136 air-interface standards for SMS, and GSM 03.40 and 09.02 standards. In one embodiment of the invention, similar to paging, an SMS communication is posted along with an intended recipient, such as a communication device in mobile vehicle 110.

Call center 180 is a location where many calls are received and serviced at the same time, or where many calls are sent at the same time. In one embodiment of the invention, the call center is a telematics call center, prescribing communications to and from telematics unit 120 in mobile vehicle 110. In another embodiment, the call center 180 is a voice call center, providing verbal communications between a communication services advisor 185 in the call center 180 and a subscriber. In another embodiment, the call center 180 contains each of these functions.

Communication services advisor 185 is a real advisor or a virtual advisor. A real advisor is a human being in verbal communication with a user or subscriber. A virtual advisor is a synthesized voice interface responding to requests from user or subscriber. In one embodiment, virtual advisor includes one or more recorded messages. In another embodiment, virtual advisor generates voice messages using a text to speech synthesis engine (TTS). In another embodiment virtual advisor includes both recorded and TTS generated messages.

Call center 180 provides services to telematics unit 120. Communication services advisor 185 provides one of a number of support services to a subscriber. Call center 180 can transmit data via data signal, such as a vehicle data upload (VDU), to telematics unit 120 in mobile vehicle 110 through wireless carrier system 140, satellite carrier systems 141, or communication network 142.

Call center 180 can determine mobile identification numbers and telematics unit identifiers associated with a telematics unit access request, compare mobile identification numbers and telematics unit identifiers with a database of identifier records, and send calling-state messages to the telematics unit 120 based on the request and identification numbers.

In one embodiment of the invention, user 172 has a local provisioning system such as user computer 150 or handheld device 170. Local provisioning system has a wireless modem to send data through wireless carrier system 140, or satellite carrier system 141, which connects to communication network 142. In another embodiment, local provisioning system has a wired modem, which connects to communications network 142. Data is received at call center 180. Call Center 180 has any suitable hardware and software capable of providing web services to help transmit messages and data signals from local provisioning system, such as, user computer 150 or handheld device 170 to telematics unit 120 in mobile vehicle 110. In another embodiment, user computer 150 or handheld device 170 has suitable hardware and software to connect to mobile vehicle 110 using a direct link to a mobile vehicle onboard data port.

Voice recognition software is installed in telematics unit 120 and is referred to as a voice recognition engine 119. Voice recognition software is executed by DSP 122. In one embodiment, pressing a button in vehicle 110 activates voice recognition engine 119. Pressing the button sends a discrete signal that places the telematics unit in audio arbitration mode allowing it to respond to voice commands.

In one embodiment of the invention call signals are received at telematics unit 120. Call signals are incoming phone calls sent by the service provider selected by the user. Call signals include an automatic number identification that identifies the phone number and/or the name of the person from whom the call signal originates. Telematics unit 120 has appropriate software enabling it to read the automatic number identification that is associated with each call signal received. DSP 122 runs program code for comparing the automatic number identification of a call signal to a list of nametag-identified numbers stored in memory 128. The list of nametag-identified numbers or nametag list is a user phonebook where the nametag-identified number is a phonebook entry having a nametag identifier, such as a persons name or a business name, that is assigned by the user, and a phone number associated with each nametag identifier. The call signal activates voice recognition engine 119, which, when coupled with text to speech synthesizer 121, is capable of interactive voice recognition. Messages generated by voice recognition engine 119 are converted to audible messages by text to speech synthesizer 121 and played through speakers 132 of telematics unit 120 or through speakers 133 of the vehicle's 110 audio system 131. User responses, such as user voice response, nametag storage voice response, or nametag request voice response, are converted to an electrical signal by microphone 130. The electrical signals are converted by voice recognition engine 119 into instructions directing DSP 122 to run program code that performs the proper function. Functions performed comprise directing phone calls to in-vehicle phone 134 or voice mail (not shown) and storing nametag-identified numbers to memory 128 of telematics unit 120.

FIG. 2 is a flow diagram of a method for audible caller identification in accordance with one embodiment of the current invention. The method for audible caller identification at 200 begins (block 205) when a call signal, including an automatic number identification, is received at an in-vehicle telematics unit (block 210). The automatic number identification of the call signal is compared to a list of nametag-identified numbers to determine whether the automatic number identification matches a nametag-identified number on a nametag list stored in the telematics unit (block 220). The nametag-identified numbers are phone numbers with associated nametags stored as a nametag list in the telematics unit. The automatic number identification will either match a nametag-identified number stored in the telematics unit or the automatic number identification will not match a nametag-identified number stored in the telematics unit (block 230). The telematics unit sends an audible user action identification message to the user so that the user hears the message through a speaker located in the vehicle. The audible user action identification message is a message sent to the user informing that user of the incoming call and asking what action should be taken regarding the call. If the automatic number identification matches a nametag-identified number stored on the nametag list in the telematics unit, the audible user action identification message comprises a phrase informing the user a call is incoming, the nametag associated with the matched nametag-identified number, and a query asking the user if they wish to accept the call (block 237). An example of an audible user action identification message where a match is found is "Call from John's office, would you like to accept this call?" where "John's office" is the nametag associated with the nametag-identified number on the nametag list. If the automatic number identification does not match a nametag-identified number stored on the nametag list in the telematics unit, the audible user action identification message comprises a phrase informing the user a call from an unknown caller is incoming and a query asking the user if they wish to accept the call (block 232). An example of an audible user action identification message where no match is found is "Call from unknown caller, would you like to accept this call?"

The telematics unit through interactive voice recognition monitors for a user voice response to the audible user action identification message (block 240). The received user voice response will be either an affirmative response, accepting the call, or a negative response, rejecting the call. The telematics unit recognizes the user voice response and determines whether to connect the call based on the user voice response (block 250). If the user voice response is a negative response, such as "no" (block 260), the call will be connected to a voicemail system (block 270) and the method ends (block 295). If the user voice response is an affirmative response, such as "yes" (block 280) the call will be connected to the user's phone (block 290) and the method ends (block 295).

In an alternate embodiment the invention, after the audible user action identification message is sent the call proceeds to ring tones and the user accepts the message by pressing a button on the in-vehicle telematics unit. This embodiment is enabled by selecting an option from a preferences menu. The preferences menu has other options that allow the user to customize the audible user action identification with nametag storage system. Examples of these options are message format, message content, response format, and response time delay. Response time delay is the length of time the system waits for a response from the user.

FIG. 3 is a flow diagram of a method for nametag storage in accordance with one embodiment of the current invention at 300. Nametag storage method begins (block 305) after the call signal is terminated (block 310). An audible nametag storage message is sent (block 320). The audible nametag storage message is a message querying the user regarding storage of the automatic number identification of the previously terminated call signal. The audible nametag storage message has a format such as "would you like to add or update this caller's number to your phonebook." The telematics unit through interactive voice recognition monitors for a nametag storage voice response to the audible nametag storage message (block 330). The nametag storage voice response is either a negative response indicating the user does not want to store the automatic number identification or an affirmative response indicating the user wants to proceed with storage of the automatic number identification. If the received nametag storage voice response is a negative response, such as "no," (block 337) the method ends (block 395).

If the received nametag storage voice response is an affirmative response, such as "yes" (block 332), an audible nametag request message is sent to the user (block 340), requesting a new nametag the to associate with the automatic number identification of the call signal. The telematics unit through interactive voice recognition monitors for a nametag request voice response to the audible nametag request message (block 345). The nametag request voice response includes the new nametag. If a nametag request voice response is not received (block 360), the method ends (block 395). If a nametag request voice response is received (block 350), the new nametag is stored with the automatic number identification of the call signal as a new nametag-identified number on the nametag list (block 370) and the method ends (block 395).

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for audible caller identification with nametag storage, the method comprising:
    receiving a call signal, the call signal including an automatic number identification;
    determining whether the automatic number identification matches a nametag-identified number on a nametag list stored in a telematics unit;
    sending an audible user action identification message based on the determination;
    monitoring for a user voice response to the audible user action identification message; and
    determining whether to connect the call signal based on a received user voice response.

2. The method of claim 1 further comprising connecting the call signal to a voicemail system when the received user voice response is negative.

3. The method of claim 1 further comprising connecting the call signal to a phone when the received user voice response is affirmative.

4. The method of claim 1, further comprising:
    sending an audible nametag storage message;
    monitoring for a nametag storage voice response to the audible nametag storage message; and
    determining whether to store a new nametag-identified number to the nametag list based on a received nametag storage voice response.

5. The method of claim 4 further comprising:
    sending an audible nametag request message based on the received nametag storage voice response;
    monitoring for a nametag request voice response to the audible nametag request message;
    receiving a new nametag with a received nametag request voice response; and
    storing the new nametag and the automatic number identification of the call signal to the nametag list based on the received nametag request voice response.

6. A computer usable medium including program code for audible caller identification with nametag storage comprising:
    computer program code for receiving a call signal, the call signal including an automatic number identification;
    computer program code for determining whether the automatic number identification matches a nametag-identified number on a nametag list stored in a telematics unit;
    computer program code for sending an audible user action identification message based on the determination;
    computer program code for monitoring for a user voice response to the audible user action identification message; and
    computer program code for determining whether to connect the call signal based on a received user voice response.

7. The computer usable medium of claim 6 further comprising:
    computer program code for connecting the call signal to a voicemail system when the received user voice response is negative.

8. The computer usable medium of claim 6 further comprising:
    computer program code for connecting the call signal to a phone when the received user voice response is affirmative.

9. The computer usable medium of claim 6 further comprising:
    computer program code for sending an audible nametag storage message;
    computer program code for monitoring for a nametag storage voice response to the audible nametag storage message; and
    computer program code for determining whether to store a new nametag-identified number to the nametag list based on a received nametag storage voice response.

10. The computer usable medium of claim 9 further comprising:
    computer program code for sending an audible nametag request message based on the received nametag storage voice response;
    computer program code for monitoring for a nametag request voice response to the nametag request message;
    computer program code for receiving a new nametag with a received nametag request voice response; and
    computer program code for storing the new nametag and the automatic number identification of the call signal to the nametag list based on the received nametag request voice response.

11. A system for audible caller identification with nametag storage comprising:
    means for receiving a call signal, the call signal including an automatic number identification;
    means for determining whether the automatic number identification matches a nametag-identified number on a nametag list stored in a telematics unit;
    means for sending an audible user action identification message based on the determination;
    means for monitoring for a user voice response to the audible user action identification message; and
    means for determining whether to connect the call signal based on a received user voice response.

12. The system of claim 11 further comprising: means for connecting the call signal to a voicemail system when the received user voice response is negative.

13. The system of claim 11 further comprising: means for connecting the call signal to a phone when the received user voice response is affirmative.

14. The system of claim 6 further comprising:
    means for sending an audible nametag storage message;
    means for monitoring for a nametag storage voice response to the audible nametag storage message; and
    means for determining whether to store a new nametag-identified number to the nametag list based on a received nametag storage voice response.

15. The system of claim 9 further comprising:
means for sending an audible nametag request message based on the received nametag storage voice response;
means for monitoring for a nametag request voice response to the nametag request message;
means for receiving a new nametag with a received nametag request voice response; and
means for storing the new nametag and the automatic number identification of the call signal to the nametag list based on the received nametag request voice response.

\* \* \* \* \*